United States Patent [19]
Müller et al.

[11] Patent Number: 4,576,416
[45] Date of Patent: Mar. 18, 1986

[54] MULTI-CIRCUIT PRESSURE MEDIUM BRAKE SYSTEM

[75] Inventors: Egbert Müller, Hochdorf; Werner Stumpe, Kornwestheim, both of Fed. Rep. of Germany

[73] Assignee: Robert Bosch GmbH, Stuttgart, Fed. Rep. of Germany

[21] Appl. No.: 676,606

[22] Filed: Dec. 3, 1984

Related U.S. Application Data

[63] Continuation of Ser. No. 415,951, Sep. 8, 1982, abandoned.

[30] Foreign Application Priority Data

Feb. 13, 1982 [DE] Fed. Rep. of Germany ....... 3205228

[51] Int. Cl.$^4$ .................... B60T 8/02; B60T 15/18
[52] U.S. Cl. ......................... 303/15; 303/14; 303/92; 303/119; 303/84 R
[58] Field of Search ............ 303/40, 52, 28, 6 R, 303/119, 6 A, 118, 8, 7, 119, 9, 13, 61–63, 68–69, 14, 15, 92, 84 R, 84 A, 17; 251/29, 30, 14, 129, 130; 137/627.5; 188/181 A

[56] References Cited

U.S. PATENT DOCUMENTS

| 3,758,167 | 9/1973 | Machek | 303/118 X |
| 3,823,984 | 7/1974 | Parfitt et al. | 303/15 X |
| 3,944,287 | 3/1976 | Nagase | 303/15 |
| 4,230,377 | 10/1980 | Goebels | 303/40 X |

FOREIGN PATENT DOCUMENTS

| 10827 | 9/1956 | Fed. Rep. of Germany. |
| 3212929 | 10/1983 | Fed. Rep. of Germany ........ 303/15 |

*Primary Examiner*—Douglas C. Butler
*Attorney, Agent, or Firm*—Edwin E. Greigg

[57] ABSTRACT

A multi-circuit pressure medium brake system in which a pressure control valve is used which can be triggered in a multi-circuit manner. One of the controls is effected electrically and generally advances ahead of a pressure-medium control, so that when the system is functioning properly, the pressure-medium control remains without effect. Various modifications for the pressure control valve have been set forth and a plurality of combinations of switching members for meeting various pressure regulating conditions have been set forth. The multi-circuit pressure medium brake system is preferably applicable to motor vehicles.

19 Claims, 9 Drawing Figures

MULTI-CIRCUIT PRESSURE MEDIUM BRAKE SYSTEM

This is a continuation of copending application Ser. No. 415,951 filed Sept. 8, 1982, now abandoned.

BACKGROUND OF THE INVENTION

The invention is based on a multi-circuit pressure medium brake system. A brake system of this kind is known (German Patent Application No. W 10827 II/63c).

In such known brake systems, the pressure control valve can be triggered only by a single circuit. If there is a defect in the control circuit, this may cause brake failure.

A brake system of this kind substantially comprises a compressor, a plurality of supply containers, a foot-actuated brake valve, a plurality of wheel brake cylinders and a pressure control valve incorporated into a connecting line to the wheel brake cylinder. The valve is triggered by the foot operated brake valve.

OBJECT AND SUMMARY OF THE INVENTION

A brake system in accordance with this invention comprises a compressor, a plurality of supply containers, a foot-actuated brake valve, a control valve and a plurality of wheel brake cylinders. One of these wheel brake cylinders is shown in the drawing. The pressure control valve is incorporated into a connecting line to the wheel brake cylinder. The pressure control valve is triggered by two brake circuits I and II. The brake circuit II receives control pressure from the above-mentioned foot operated brake valve and this pressure is then effective in the switching chamber of the control valve. The other brake circuit I draws its control pressure from a supply container; this pressure is present at the magnetic valve and after the switchover of the magnetic valve due to an electrical signal, reaches the switching chamber. The pressure from the supply container is available at the same time, as relay pressure, at the relay valve and after the switchover of the relay valve reaches the brake cylinder.

Triggering of the pressure control valve is effected via dual circuits, that is, via a brake valve (pressure medium) on the one hand and via a magnetic valve (electric) on the other, and the electrical control and pressure control to the pressure control valve is actuated upon the actuation of the brake pedal. The two actuation operations are separated from one another, so that only one actuation—usually the faster, electrical one—takes effect. If the electrical circuit has a failure then the pressure medium actuates the control valve.

The multi-circuit pressure medium brake system of this invention has the advantage over the prior art that in the event of the failure of one control circuit, the intact control circuit or circuits is still capable of controlling the pressure control valve. In this manner, the reliability of the brake system is increased.

It is furthermore advantageous that the pressure control valve is triggerable with both an electrical signal and a pressure medium signal, as a result of which rapid switching is assured at least when the system is intact.

Finally, it is also advantageous that the pressure control valve can be used in a regulating circuit, for instance so as to cooperate with an antiskid brake system.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
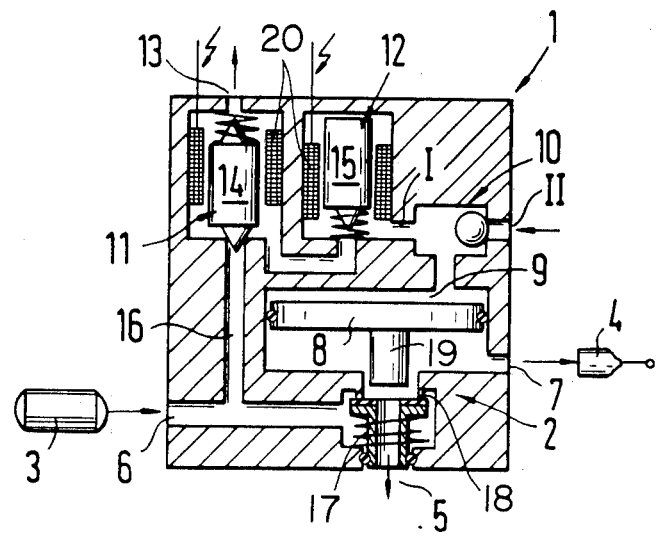
FIG. 1 shows a pressure control valve having an OR member disposed between an electrical trigger means and a relay valve.

The pressure control valve as shown in FIGS. 1–8 are placed in a pressure line between a pressure source 3 and each brake cylinder at each wheel as represented by a brake cylinder 4. A foot actuated brake valve, not shown, controls an electrical current over control circuit I and a pressure medium over control circuit II which are applied to the control valve in order to permit pressure to flow from the pressure source to the brake cylinder.

A pressure control valve 1 of a brake system has a relay valve 2, which is disposed between a source of pressure medium (supply container 3) and a brake cylinder 4 and a fluid return connection or relief point 5. Respective housing connections 6 and 7 are provided for effecting the connection with the source of pressure medium 3 and the brake cylinder 4.

The relay valve 2 comprises a spring loaded valve or piston 17 that seats against a valve seat 18 to prevent fluid under pressure from flowing from pressure supply container 3 to the wheel cylinder 4. A relay piston, which as a movable wall 8 and a tang 19 that extends toward spring loaded piston 17 defines a switching chamber 9. This switching chamber 9 may be connected selectively to one of two control circuits I and II via an OR element 10 embodied as a dual check valve; both control circuits I and II are capable of bringing to bear the required control pressure. Pressure applied to movable wall 8 from above, forces the tang against spring loaded piston 17 to close the opening 5 and unseats the piston 17; therefore, fluid under pressure can be admitted to the chamber 9 and to the wheel cylinder 4 through the valve 2.

The control circuit I has electrical switching members, specifically a 3/2-way magnetic valve 11 and a 2/2-way magnetic valve 12. A relief point 13 is monitored by the magnetic valve 11. Respective armatures 14 and 15 of the two magnetic valves 11 and 12 are provided with closure elements, which operate to monitor a housing conduit 16 leading from the housing connection 6 to the OR element 10. An electrical current controlled by a foot-actuated brake valve, not shown, is directed to the coils 20 of magnetic valves 11 and 12 which causes each of the armatures to move within the coils due to a magnetic attraction as well known in the art.

MODE OF OPERATION

In the illustrated position of the magnetic valves 11 and 12 and of the relay valve 2, the brake cylinder 4 is relieved via the relief point 5, and the switching chamber 9 is connected to the relief point 13 via magnetic valve 12.

If the brake is actuated and the system is functioning properly, then a signal arrives at the pressure control valve 1 from both sides, that is, an electrical signal from the control circuit I and a pressure medium signal from the control circuit II. Since the electrical signal is quicker, the 3/2-way magnetic valve 11 is switched over first in the pressure control valve 1, so that armature 14 unseats from line 16 which outlet 13 is closed and the pressure medium flows from the source of pressure medium 3 through the housing conduit 16 to the OR element 10 and via the OR element into the switchinfg chamber 9. The pressure increase in control circuit II which trails behind is no longer capable of switching over the OR element 10, so that when the system is intact this OR element 10 remains in its illustrated position. The relay valve 2 is switched over by the pressure in the switching chamber 9, so that the relief point 5 is closed by the tang 19 which forces the piston 17 downward so that valve 2 opened, and the brake cylinder 4 is connected with the source of pressure medium 3. The brakes are actuated. With the 2/2-way magnetic valve 12 closed, the pressure in the switching chamber 9 can be maintained; this valve 12 thus acts as a kind of maintenance valve.

Upon the release of the brakes, all the valves of the pressure control valve 1 return to their initial positions, as shown in FIG. 1. In the rest position as shown in FIG. 1, it is noted that both openings 5 and 13 are open so that in this position of the valve continuous communication is made with the surrounding air via openings 5 and 13 and the fluid pressure in cylinder 4 is released through openings 5 and 13. However, if a pressure still remains in the control circuit II, a pressure drop cannot be effected with the control circuit I; that is, the brake cylinder pressure cannot be lower than the control pressure in the control circuit II. The OR element 10 then assumes its alternative position.

It should further be noted that the pressure of the pressure medium source 3 and the control pressure of the control circuit II are drawn from the same pressure reservoir.

Figure 2:
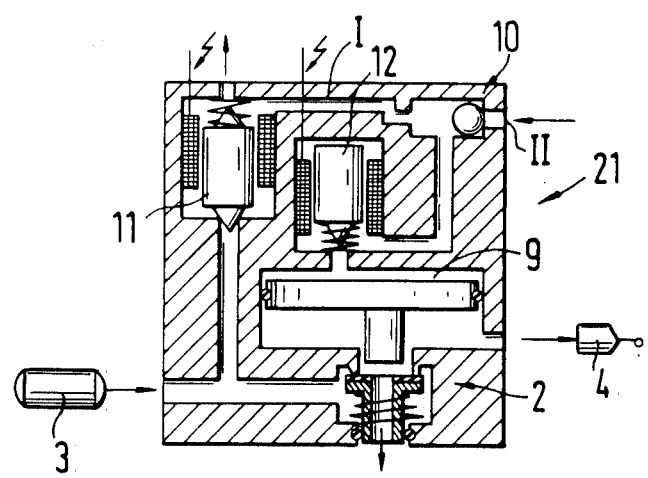
FIG. 2 shows a pressure control valve having the OR member between parts of the electrical trigger means.

In a pressure control valve 21 such as that shown in FIG. 2, the OR element 10 is disposed between the two electromagnetic valves 11 and 12. The 2/2-way magnetic valve 12 is disposed directly ahead of the switching chamber 9. This kind of design has the advantage that, given corresponding switching positions of the magnetic valves 11 and 12 during the course of a braking action, the OR element 10 is actuated more frequently, which increases the functional reliability of the OR element. Activation of valves 11 and 12 permits fluid to flow from source 3 alongside valve 11 to the OR chamber by valve 12 to chamber 9 which opens relay valve 2 to the cylinder 4.

Figure 3:
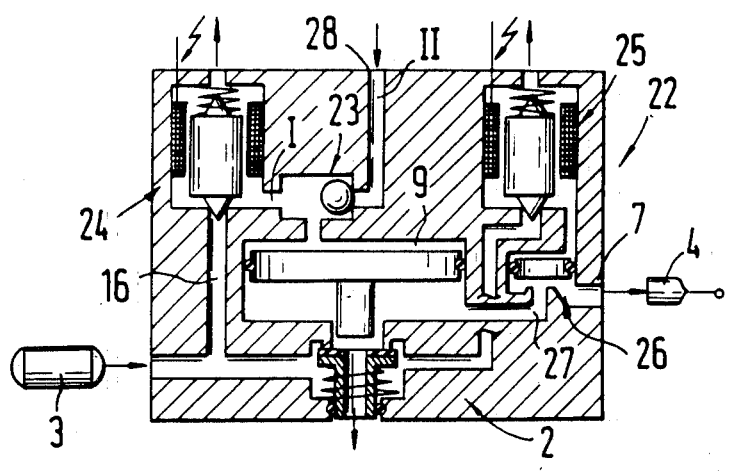
FIG. 3 shows a pressure control valve having a maintenance valve connected at its output side.

FIG. 3 shows a pressure control valve 22, which is equipped with one OR element 23 and two 3/2-way magnetic valves 24 and 25. A control circuit connection for the control circuit II is indicated at 28.

The first magnetic valve 24 corresponds to that of FIGS. 1 and 2. The second magnetic valve 25 is a pilot valve for a pressure-actuated main valve 26, which is disposed behind the relay valve 2 and monitors a conduit connection 27 with the housing connection 7 for the brake cylinder 4.

With a main valve 26 disposed following the switching chamber 9 in this manner, it is possible in a multiple-main-valve system to have multiple-conduit regulation of the brake pressure. The operation of the control valve is obvious from the above description.

Figure 4A:
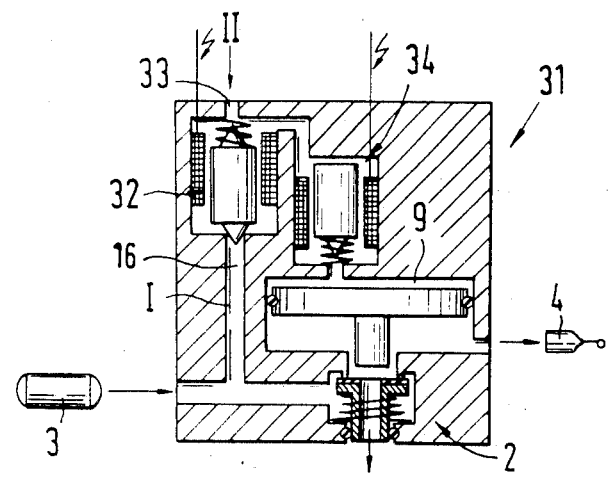
FIG. 4a shows a pressure control valve having a control pressure supply means which can be monitored by a magnetic valve.

FIG. 4a shows a pressure control valve 31, in which one OR element is replaced with a 3/2-way magnetic valve 32. The magnetic valve 32, with its armature, directly monitors both the housing conduit 16 connected with the pressure supply and a control circuit connection 33 of the control circuit II. Directly ahead of the switching chamber 9, there is a 2/2-way magnetic valve 34 for the maintenance function, which as in FIG. 3 can also be attained by means of a 3/2-way magnetic valve disposed following the switching chamber 9.

In this design, the control circuit II can be blocked selectively with the magnetic valve 32, so that an OR element is not necessary. An electric pressure regulation is possible between the control pressure of the control circuit II and the pressure of the pressure source 3, which supplies the control circuit I directly. As in the description of FIG. 1, magnetic valve 32 closes the opening 33 during operation and opens channel 16.

Figure 4B:
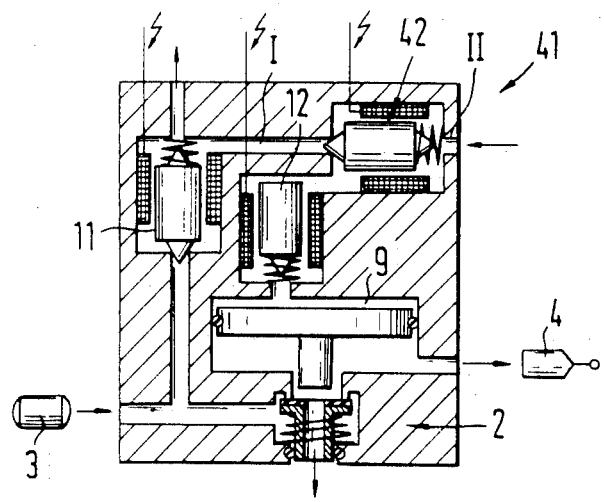
FIG. 4b shows a pressure control valve having an additional magnetic valve in the control line.

FIG. 4b shows a pressure control valve 41, which instead of an OR element has an independent 3/2-way magnetic valve 42. Otherwise, this design is equivalent to that shown in FIG. 2. Identical elements are thus identified by the same reference numerals.

With a design of this kind, separate control of control circuits I and II is possible by use of different electrical control circuits which are connected to the coils of the electromagnets 11, 12 and 42. The pressure in the brake cylinder 4 can be dropped to 0 bar using the electrical control means (control circuit I), despite an existing control pressure. This is important in the event that an integrated antiskid brake system is envisaged or added to the system.

It should also be noted that in this design a pilot-controlled main valve 26, as shown in FIG. 3, can be used instead of the 2/2-way magnetic valve 12 acting as a maintenance valve. With multiple main valves 26 switched in sequence, multiple-conduit regulation is possible.

Figure 5:
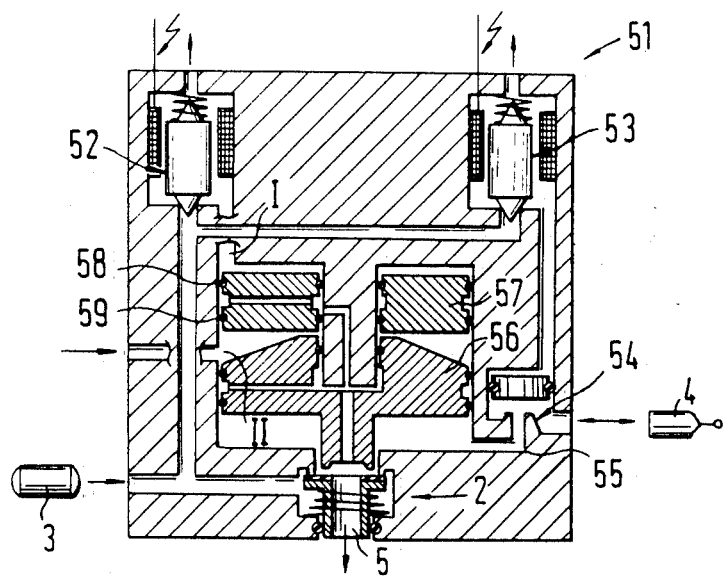
FIG. 5 shows a design having a drag piston.

In FIG. 5, a pressure control valve 51 is shown, which is equipped with two 3/2-way magnetic valves 52 and 53. The first magnetic valve 52 is located in the control circuit I; the other magnetic valve 53 is a pilot valve of a main valve 54, which is located in a conduit connection 55 leading to the brake cylinder 4. A relay piston 56 is coupled with an additional drag piston 57, and this drag piston 57 has two seals 58 and 59, between which an outside-air connection is disposed. The outside-air connection communicates with the relief point 5 of the relay valve 2. The control circuit II is connected to a chamber located between the two pistons 56 and 57.

This design, having an outside-air connection between the sealing locations, is used if the pressure-medium control pressure of the control circuit II, and the control pressure of control circuit I which is electrically triggered from the pressure source 3, are derived from different pressure sources which, as prescribed by official regulations, have to be kept completely separate from one another. An electrically controlled maintenance function is provided by the main valve 54. The OR decision for either control circuit I or control circuit II is assumed in this case by the relay piston 56 with the drag piston 57. Depending upon which control circuit, I or II, is activated first, the piston 57 or the piston 56 switches the relay valve 2 over. If a seal 58 or 59 should fail, the air intended for switching over the relay valve 2 is blown out audibly at the relief point 5. In this design, the control pressure is lower than the pressure in the brake cylinder 4, and the pressure in the brake cylinder 4 in turn is lower than the pressure of the pressure source 3.

Figure 6:
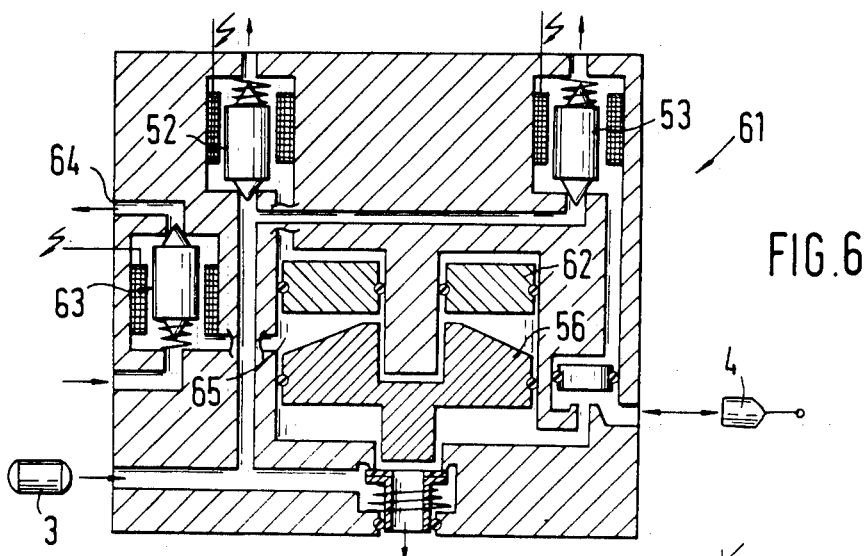
FIG. 6 shows a modification of the design of FIG. 5 having an additional control pressure monitoring valve.

FIG. 6 shows a pressure control valve 61 which has a drag piston 62 but does not have a dual seal. Here, a relief connection 64, monitored by an additional 3/2-way magnetic valve 63, is provided for a chamber 65 located between the two pistons 56 and 62; again, a seal failure can be recognized by the audible outrush of air. Otherwise, the design corresponds to that of FIG. 5. The control pressure can be blocked from the chamber 65 by the magnetic valve 63; that is, it may also be higher than the pressure in the brake cylinder 4.

Figure 7:
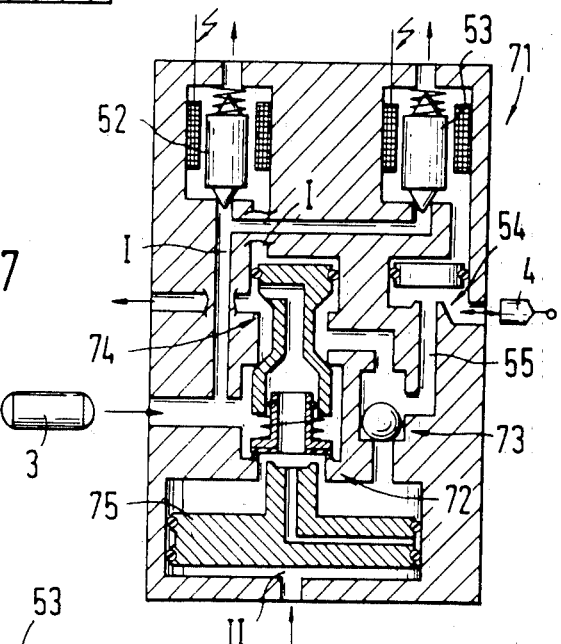
FIG. 7 shows a pressure control valve having a separate means of quantity regulation.
Figure 8:
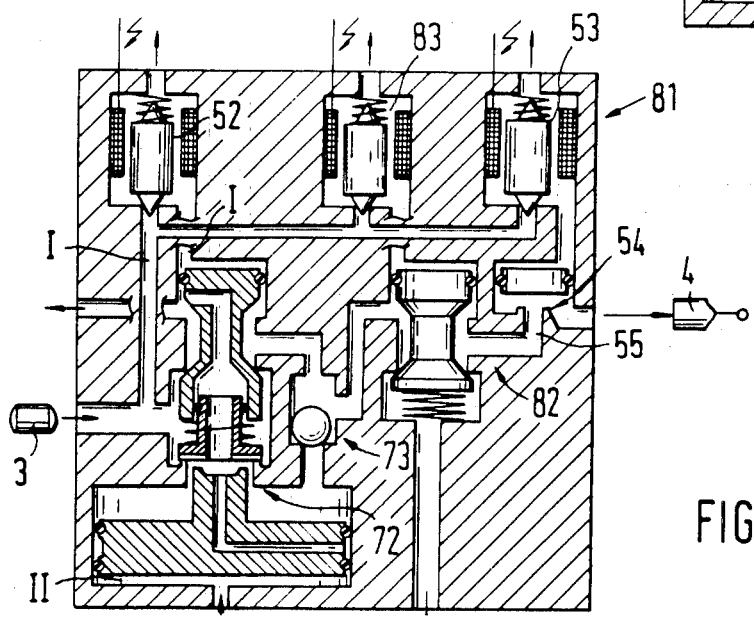
FIG. 8 shows a modification of the design of FIG. 7 having an additional blocking valve.

FIG. 7 relates to a pressure control valve 71 having a similar magnetic valve disposition to the design shown in FIG. 5. Identical elements are thus identified by the same reference numerals. However, in this case a relay valve 72 is embodied differently. It has a relay piston 75, which is acted upon from below by the control pressure from the control circuit II. An OR element 73, embodied as a dual check valve, and an additional switching valve 74, controlled via the magnetic valve 52, are also used in this embodiemnt. The switching valve 74 is a quantity-regulating valve.

The pressure diverted by the relay valve 72 proceeds via the OR element 73 to the brake cylinder 4. However, this occurs only if the normally more rapid electrical control of the control circuit I has failed. If the system is intact, control is performed by the switching valve 74. In this design, the control pressure in the control circuit II is equal to or less than the brake cylinder pressure.

The pressure control valve 81 shown in FIG. 1 is embodied identically to that of FIG. 7, except that here a blocking valve 82 having a 3/2-way magnetic valve 83 as a pilot valve is additionally provided. With this additional valve 82, it is attained that despite an existing control pressure (from either control circuit, I or II), the pressure in the brake cylinder 4 can be reduced to 0 bar. A switching possibility of this kind is important in the event that the pressure control valve 81 is to be used in connection with an antiskid brake system.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A brake system comprising a fluid pressure source from a fluid pressure line, at least one brake cylinder connected to said fluid pressure line which is initiated in accordance with a brake pedal position, at least one fluid pressure control valve in said fluid pressure line in said brake system which controls fluid under pressure from said fluid pressure source to said at least one brake cylinder, a relay control valve in said at least one fluid pressure control valve that controls fluid flow from said fluid pressure source to said at least one brake cylinder, first and second pressure control lines in said at least one fluid pressure control valve that applies fluid under pressure which operates said relay control valve, said at least one fluid pressure control valve including electromagnetic switching valves therein connected to and controlled by a first of two simultaneously operated brake control circuits which controls fluid under pressure from said first fluid pressure control line to said relay control valve for controlling flow of fluid under pressure through said at least one pressure control valve to said at least one pressure brake cylinder for operation thereof, and said second fluid pressure control line is connected to a second of said two simultaneously operated brake control circuits for operation of said relay control valve in the event said electromagnetic switching valves malfunction.

2. A brake system as defined by claim 1, characterized in that said at least one fluid pressure control valve is a relay valve including a switching chamber which is supplied with fluid pressure by one of said at least two brake control circuits.

3. A brake system as defined by claim 2, comprising at least two electromagnetic valves as switching members in an electrically controlled fluid pressure line which are inserted into a pressure circuit between a source of fluid pressure medium and said switching chamber.

4. A brake system as defined by claim 3, in which said electromagnetic valves open and close pressure openings in said at least one fluid pressure control valve for monitoring an inflow of fluid under pressure from said source of pressure medium to said switching chamber as well as monitoring an outflow of fluid from said switching chamber and are capable of maintaining a fluid under pressure in said switching chamber.

5. A multi-circuit pressure medium brake system as set forth in claim 4 in which said switching chamber is supplied only with one control pressure.

6. A multi-circuit pressure medium brake system as set forth in claim 3 in which said switching chamber is supplied only with one control pressure.

7. A multi-circuit pressure medium brake system as set forth in claim 2 which includes an OR element which is integrated with the pressure control valve for dual-circuit triggering of said pressure control valve.

8. A multi-circuit pressure medium brake system as defined by claim 7, in which one electromagnetic valve is located preceding said OR element in a direction toward the switching chamber.

9. A multi-circuit pressure medium brake system as defined by claim 7, in which an electromagnetic valve is located subsequent to said OR element in a direction toward said switching chamber.

10. A multi-circuit pressure medium brake system as defined by claim 7, in which one electromagnetic valve comprises a combination of a 3/2-way pilot valve and a pressure-actuated main valve and is inserted downstream said relay valve into a conduit connection with a brake cylinder.

11. A multi-circuit pressure medium brake system as defined by claim 7, in which said OR element is embodied by the insertion of a 3/2-way magnetic valve into a control circuit connection.

12. A multi-circuit pressure medium brake system as defined by claim 7, in which said OR element is embodied by the insertion of a 3/2-way magnetic valve into a pressure medium control line.

13. A multi-circuit pressure medium brake system as defined by claim 2, in which a relay piston of said relay valve is combined with an additional drag piston.

14. A multi-circuit pressure medium brake system as defined by claim 13, in which said drag piston includes two seals between which there is an outside-air connection.

15. A multi-circuit pressure medium brake system as defined by claim 13, in which a chamber is situated between said relay piston and said drag piston and is selectively connectable via a 3/2-way magnetic valve to either a control circuit or an outside-air connection.

16. A multi-circuit pressure medium brake system as set forth in claim 2 in which said switching chamber is supplied only with one control pressure.

17. A multi-circuit pressure medium brake system as defined by claim 1, which includes an additional pressure-dependent quantity regulating valve in said pressure control valve.

18. A multi-circuit pressure medium brake system as defined by claim 17, which includes an additional pressure-dependent blocking valve in said pressure control valve.

19. A multi-circuit pressure medium brake system as defined by claim 18, in which said blocking valve is pre-controllable by a 3/2-way magnetic valve.

* * * * *